(12) United States Patent
Massotte et al.

(10) Patent No.: US 9,994,417 B2
(45) Date of Patent: Jun. 12, 2018

(54) ROLLER FOR A WIRE-FEED DEVICE

(71) Applicant: Superba S.A.S., Mulhouse (FR)

(72) Inventors: Philippe Massotte, Gueberschwihr (FR); Michel Mazoyer, Zimmersheim (FR); Daniel Scaravella, Guewenheim (FR); Baptiste Tredan, Illzach (FR)

(73) Assignee: Superba S.A.S., Mulhouse (FR)

( * ) Notice: Subject to any disclaimer, the term of this patent is extended or adjusted under 35 U.S.C. 154(b) by 347 days.

(21) Appl. No.: 15/000,152

(22) Filed: Jan. 19, 2016

(65) Prior Publication Data
US 2016/0207734 A1   Jul. 21, 2016

(30) Foreign Application Priority Data

Jan. 20, 2015   (EP) .................................. 15305060

(51) Int. Cl.
*B65H 51/04* (2006.01)
*D02G 1/12* (2006.01)
*F16C 13/00* (2006.01)

(52) U.S. Cl.
CPC ............... *B65H 51/04* (2013.01); *D02G 1/12* (2013.01); *F16C 13/00* (2013.01)

(58) Field of Classification Search
CPC ........ B65H 59/18; B65H 59/20; B65H 59/22; B65H 59/225; B65H 59/24; B65H 59/26; B65H 59/28; B65H 59/30; B65H 59/32; B65H 59/34; B65H 59/36
USPC ............................................. 492/39, 45, 47
See application file for complete search history.

(56) References Cited

U.S. PATENT DOCUMENTS

| 2,846,729 | A | | 8/1958 | Sonnino | |
| 3,097,022 | A | * | 7/1963 | Sernetz | B65G 39/09 15/179 |
| 3,649,985 | A | * | 3/1972 | Hunt | A46B 13/001 15/179 |

(Continued)

FOREIGN PATENT DOCUMENTS

| DE | 10112185 A1 | 9/2002 |
| EP | 2792772 A1 | 10/2014 |

(Continued)

OTHER PUBLICATIONS

Europe Patent Application No. 15305060.4, Search Report dated May 28, 2015, 6 pages.

*Primary Examiner* — Jason L Vaughan
(74) *Attorney, Agent, or Firm* — Kilpatrick Townsend & Stockton LLP; Dean W. Russell; Renae Bailey Wainwright

(57) ABSTRACT

This invention relates to a roller for a wire-feed device having a main cylindrical body forming a hub designed to be driven in rotation about its axis of symmetry, a peripheral cylindrical structure forming an idler roller mounted round the perimeter of the main body, and a means for the cylindrical structure to be driven in rotation by the main body. Moreover, the internal diameter of the cylindrical structure is greater than the external diameter of the main body so as to create a space between the cylindrical structure and the main body to enable a displacement of the cylindrical structure in relation to the main body with a misalignment of the axis of rotation of the cylindrical structure in relation to the axis of rotation of the main body.

14 Claims, 1 Drawing Sheet

(56) References Cited

U.S. PATENT DOCUMENTS

Figure 1:
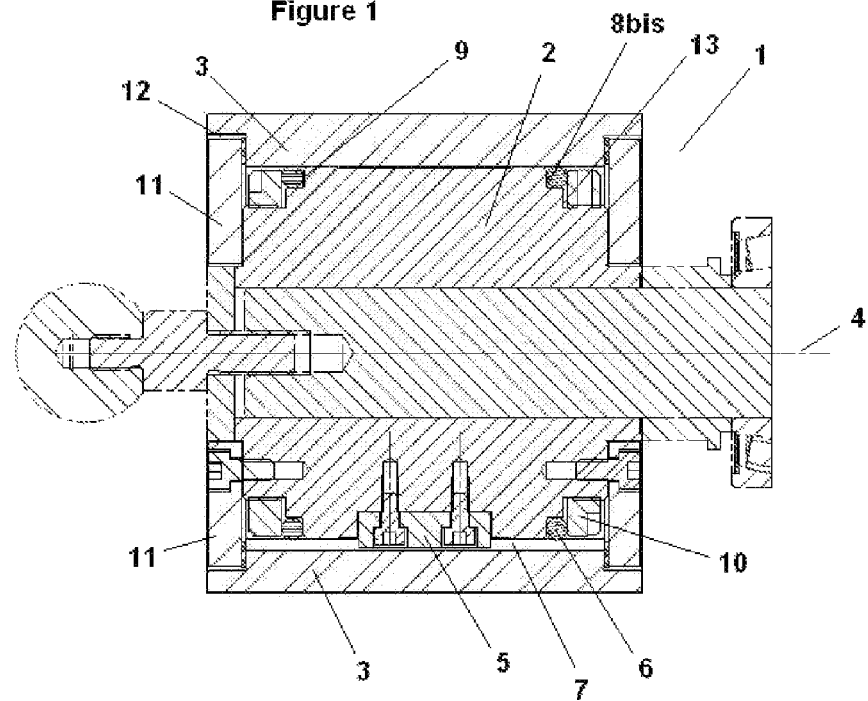

| | | | | |
|---|---|---|---|---|
| 4,125,073 | A * | 11/1978 | Bain | B41F 7/04 |
| | | | | 101/216 |
| 4,716,637 | A * | 1/1988 | McIntosh | B65G 39/02 |
| | | | | 492/39 |
| 4,974,782 | A * | 12/1990 | Nelson | G03F 7/0027 |
| | | | | 100/162 B |
| 5,688,217 | A * | 11/1997 | Izume | B41F 31/14 |
| | | | | 492/39 |
| 5,803,235 | A * | 9/1998 | McGinnis | B65G 39/06 |
| | | | | 198/843 |
| 5,906,567 | A | 5/1999 | Gautier | |
| 5,984,846 | A * | 11/1999 | Hirschberg | D21G 1/0206 |
| | | | | 241/293 |
| 6,078,769 | A * | 6/2000 | Fraser | B41F 13/085 |
| | | | | 399/279 |
| 7,341,550 | B2 * | 3/2008 | van Haag | D21G 1/008 |
| | | | | 101/216 |
| 7,387,584 | B2 * | 6/2008 | Miyata | F16H 7/12 |
| | | | | 474/197 |
| 7,850,587 | B2 | 12/2010 | Sano | |
| 8,046,885 | B1 | 11/2011 | Massotte | |

FOREIGN PATENT DOCUMENTS

| | | | |
|---|---|---|---|
| GB | 1166372 | A | 10/1969 |
| JP | H09-120212 | A | 5/1997 |
| WO | 1996013691 | A1 | 5/1996 |

\* cited by examiner

ROLLER FOR A WIRE-FEED DEVICE

CROSS-REFERENCE TO RELATED APPLICATION

The present application claims the benefit of European Patent Application No. 15305060.4 filed Jan. 20, 2015, the contents of which are incorporated herein by reference in their entirety.

FIELD OF THE INVENTION

This invention relates to the field of wire-feed mechanisms in a processing system and more particularly to the field of wire-feed mechanisms at the inlet of a crimping box.

BACKGROUND OF THE INVENTION

Currently, the wire-feed device of a wire-processing system uses at least one intake roller and one pair of crimping rollers between which the feed wire is positioned. The two crimping rollers are mounted to rotate about two parallel axes so that their respective rotations occur in opposite directions. The two crimping rollers are then pressed against each other so that these rollers, being in contact, cause the feed wire to be movably guided along an axis perpendicular to the axes of rotation of these rollers.

In existing feed mechanisms, however, when a wire is not correctly tensioned on the crimping rollers or is knotted or tangled, the pressure exerted by the rollers between themselves and against the moving wire may, if this pressure is too great, cause the wire to break. This breakage, once detected, then requires the entire system to be stopped in order to effect a repair and impacts upon the quality of the entire reel of processed wire.

Considering the processing rate of existing systems, breakage of a wire paralyses the system and can quickly give rise to serious qualitative and quantitative consequences in terms of production.

BRIEF SUMMARY OF THE INVENTION

The aim of the present invention is to overcome these drawbacks by proposing a solution that considerably, or indeed completely, reduces the risk of breakage of the wire on the crimping rollers.

Disclosed is a roller for a wire-feed device, comprising at least:
a main cylindrical body forming a hub designed to be driven in rotation about its axis of symmetry,
a peripheral cylindrical structure forming an idler roller mounted round the perimeter of the main body,
a means for the cylindrical structure to be driven in rotation by the main body,
the internal diameter of the cylindrical structure being greater than the external diameter of the main body so as to create a space between the cylindrical structure and the main body to enable a displacement of the cylindrical structure in relation to the main body with a misalignment of the axis of rotation of the cylindrical structure in relation to the axis of rotation of the main body.

Also disclosed is a wire-feed device comprising at least one roller according to the invention.

BRIEF DESCRIPTION OF THE SEVERAL VIEW OF THE DRAWINGS

Figure 2:
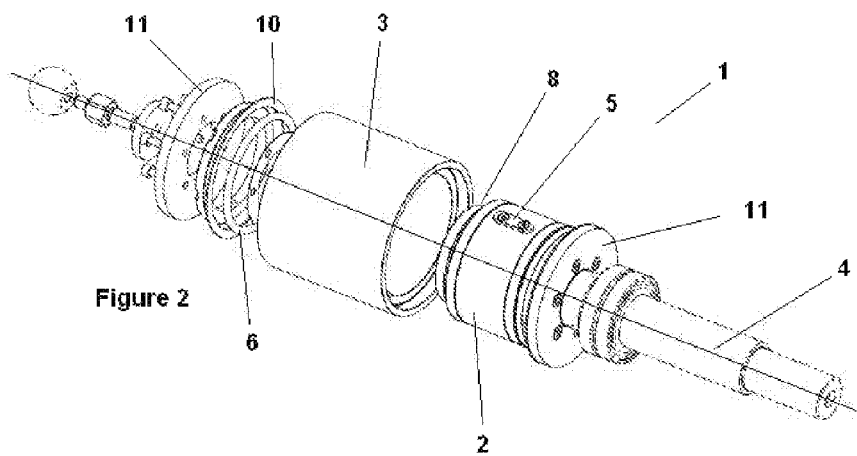

A better understanding of the invention will emerge from the following description of an embodiment, given by way of a non-limiting example, and explained with reference to the accompanying schematic drawings, in which:

FIG. 1 is a schematic representation of a roller according to an example along a cross-section passing through the axis of rotation of the roller, FIG. 2 is a schematic representation of a roller according to an example showing an exploded view of the roller.

DETAILED DESCRIPTION OF THE INVENTION

Disclosed is a roller 1 for a wire-feed device comprising at least:
a main cylindrical body 2 forming a hub designed to be driven in rotation about its axis 4 of symmetry,
a peripheral cylindrical structure 3 forming an idler roller mounted round the perimeter of the main body 2,
a means 5 for the cylindrical structure 3 to be driven in rotation by the main body 2,
the internal diameter of the cylindrical structure 3 being greater than the external diameter of the main body 2 so as to create a space 7 between the cylindrical structure 3 and the main body 2 to enable a movement of the cylindrical structure 3 in relation to the main body 2 with a misalignment of the axis of rotation of the cylindrical structure 3 in relation to the axis of rotation 4 of the main body 2.

When the cylindrical structure 3 of the roller 1 encounters an obstacle or unexpected thickness, this cylindrical structure 3 is displaced.

When the roller that incorporates this movable cylindrical structure 3 cooperates with a second roller, that is identical or of conventional construction, as in the case of crimping rollers, in the event of an obstacle, the displacement of the cylindrical structure 3 in relation to the main body 2 occurs with an offset of the axis of rotation of the cylindrical structure 3 creating a gap, for example, in relation to the axis of rotation of the second roller. Thus, the pressure exerted between these two rollers in contact with each other is reduced. The reduction in pressure thus allows any risk of breakage by crushing a knot in the wire moving between the two rollers to be limited or even eliminated.

According to a particular mode of construction, the roller 1 is characterized in that the means 5 for the cylindrical structure 3 to be driven in rotation by the main body 2 comprises at least one first stop 5 located on the external surface of the main body 2 and designed to interact with a second stop positioned on the internal face of the cylindrical structure 3.

Thus, the rotational movement generated by the main body 2 is transmitted to the cylindrical structure 3 at an interaction between two stops, each of these stops being carried by one of the two parts, main body 2 or cylindrical structure 3. The positioning of these stops enables the cylindrical structure 3 and the main body 2 to be associated in a rotationally fixed manner, whilst enabling displacement of the axis of rotation of the cylindrical structure 3 in relation to the axis of rotation 4 of the main body 2. This displacement can be achieved by translation or by inclination of the axis of rotation of the cylindrical structure 3 in relation to the axis of rotation 4 of the main body 2, or even by a combination of these two movements.

According to a preferred mode of construction, the stops are mounted on the main body 2 and on the cylindrical structure 3 so as not to occupy all of the space 7 separating the main body 2 from the cylindrical structure 3. The stops must be capable of sliding in relation to each other along an axis perpendicular to the axes of rotation of the main body 2 and the cylindrical structure 3 and passing through these axes of rotation.

According to a feature of this particular mode of construction, the roller 1 for a wire-feed device is characterized in that at least one stop is in the form of a key mounted on the corresponding surface. The key can be fitted onto a surface by one or more screws that pass through the key to fix it to the corresponding surface.

According to another particular mode of construction, the roller 1 for a wire-feed device according to the invention is characterized in that the displacement of the cylindrical structure 3 in relation to the main body 2 is controlled by at least one elastic means 6 arranged in the space 7 which separates these two parts 2, 3. This elastic means 6, located in the space 7, due to its properties of deformation, limits the amplitude of displacement of parts 2 and 3 in relation to each other.

Considering the possibility for the cylindrical structure 3 to be capable of displacing its axis of rotation in relation to the entire periphery of the main body 2, a preferred embodiment of this particular construction involves incorporating an elastic means 6 of circular structure into the roller 1. However, this elastic means 6 may alternatively have any form capable of bestowing similar properties. For example, a possibility of alternative elastic means may involve positioning at least one first elastic element along a first displacement axis between the main body 2 and the cylindrical structure 3, and at least one second elastic element along a second displacement axis between the main body 2 and the cylindrical structure 3, the first and second displacement axes not being confused with each other and having an intersection with the axis of rotation 4 of the main body 2.

According to another alternative, the elastic means 6 and the means 5 for the cylindrical structure 3 to be driven in rotation by the main body 2 are achieved by one and the same element, for example a silicone elastic part that is fixed to the cylindrical structure 3 and to the main body 2 and enables this rotating drive while allowing a displacement of the axis of rotation of the cylindrical structure 3 in relation to that 4 of the main body 2.

According to a specific feature of this particular mode of construction, the roller 1 for a wire-feed device according to the invention is characterized in that at least one elastic means 6 is arranged in the space 7 which separates the cylindrical structure 3 from the main body 2, in at least one housing 8 open into this space and carried by at least one of the two parts 2, 3.

According to another specific feature of this particular mode of construction, the roller 1 is characterized in that at least one elastic means 6 is arranged in the space 7 which separates the cylindrical structure 3 from the main body 2, in at least one shoulder 8bis carried by one of the two parts 2, 3 and open in a direction towards one of the sides of the roller 1 crossed by the axis of rotation 4. It should be noted that these sides of the roller crossed by the axis of rotation 4, constitute those that do not form part of the radial surface. These sides can however be partitioned off by one or more means adapted with a view, for example, to protecting the mechanism of the roller 1.

The solution of housing the elastic means 6 in the shoulder 8bis allows at least one of the two parts, namely the cylindrical structure 3 and the main body 2, to be arranged so as to position the elastic means 6, on the one hand, in contact with the space 7 which separates the cylindrical structure 3 from the main body 2 and, on the other, in contact with an opening that facilitates the positioning of this elastic means during the construction of the roller 1.

According to another additional particular mode of construction, the roller 1 is characterized in that it also comprises a means 10 of pre-tightening the elastic means 6 so as to create a preload of this elastic means 6. In fact, the creation of a pre-load on the elastic means 6 enables the capacity of deformation of the elastic means 6 to be modified and thus limit the amplitude of displacement of the cylindrical structure 3 in relation to the main body 2.

According to a specific feature of this particular construction, the roller 1 is characterized in that the pre-tightening means 10 is formed by at least one washer fitted at one of the sides of the cylindrical structure 3 or of the main body 2 crossed by the axis of rotation 4 and arranged to create an axial tightening along an axis parallel to the axis of rotation 4 of the roller 1. Here too, the sides of the cylindrical structure 3 or main body 2 crossed by the axis of rotation 4 are those that do not form part of the radial surfaces of these two parts.

Thus the preferred assembly and construction of the roller 1 involve positioning an elastic means 6 then a pre-tightening means 10 from the outside, so that the elastic means 6 is squeezed between the pre-tightening means 10 and a surface 9 of the housing 8 that houses the elastic means 6.

In the example of roller shown in the Figures of this document, the elastic means 6 is housed in a first shoulder 8bis of a size that is sufficiently small for this elastic means 6 to overhang this housing 8bis at a second shoulder 13 which houses a pre-tightening means 10. The displacement of the pre-tightening means 10 in its housing 13 formed by a shoulder thus allows stress to be created by exerting pressure on the elastic means 6.

According to a specific feature of construction, the roller 1 is characterized in that at least one of the faces of the roller 1 crossed by the axis of rotation 4 is partitioned off by a disk 11 mounted on the main body 2 and having a peripheral edge facing the interior wall of the cylindrical structure 3.

According to a characteristic of this specific feature of construction, the roller 1 is characterized in that the cylindrical structure 3 is independent in the displacement of its axis of rotation in relation to the partitioning disk 11 and makes no direct contact with this partitioning disk 11. This arrangement therefore allows a change in the axis of rotation of the cylindrical structure 3 in relation to the main body 2 without this cylindrical structure being hampered in its operation by a partitioning disc 11.

According to another additional specific feature, the roller 1 is characterized in that the cylindrical structure 3 comprises a shoulder 12 at its internal face designed to accommodate the peripheral edge of a partitioning disk 11. Such an arrangement allows a cylindrical structure 3 to be created which is permanently in contact with the moving wire. This arrangement thus prevents the wire from interacting with the periphery of one of the partitioning disks 11.

Although the examples illustrated in the Figures of this document show the fitting of a roller 1 in which the means 10 of pre-tightening the elastic means 6 is adjusted prior to fitting the partitioning disks 11 in the roller 1, a mechanism for adjusting the pre-tightening means 10 can be envisaged without the need to remove the partitioning disks 11 to access the pre-tightening means 10.

According to a non-limiting mode of construction of the invention, the roller is characterized in that the main body 2, the cylindrical structure 3 and/or at least two elastic means 6, and/or at least two pre-tightening means 10 and/or at least two partitioning disks 11 are mounted symmetrically on either side of a plane perpendicular to the axis of rotation 4 of the roller 1.

The invention also relates to a wire-feed device comprising at least one roller according to the invention.

According to a specific feature of construction of the feed device, the roller according to the invention is incorporated with a crimping roller upstream of a crimping box. Also, the roller of the invention can be used for a wire-feed device within a crimping box.

Clearly, the invention is not limited to the embodiment described and represented in the accompanying drawings. Modifications are possible, particularly from the point of view of the constitution of the various parts or by substitution of technical equivalents, without departing from the scope of protection of the invention.

The invention claimed is:

1. Roller for a wire-feed device comprising:
a main cylindrical body forming a hub designed to be driven in rotation about an axis of rotation of the main cylindrical body,
a peripheral cylindrical structure mounted around a perimeter of the main cylindrical body and configured to move between a first configuration and a second configuration,
a means for the peripheral cylindrical structure to be driven in rotation by the main cylindrical body when the peripheral cylindrical structure is in the first configuration,
wherein an internal diameter of the peripheral cylindrical structure is greater than an external diameter of the main cylindrical body so as to create a space between the peripheral cylindrical structure and the main cylindrical body to enable a displacement of the peripheral cylindrical structure in relation to the main cylindrical body, wherein the displacement moves the peripheral cylindrical structure from the first configuration to the second configuration,
wherein, when the peripheral cylindrical structure is in the second configuration, an axis of rotation of the peripheral cylindrical structure is offset from the axis of rotation of the main cylindrical body and the means for the peripheral cylindrical structure to be driven in rotation by the main cylindrical body is disengaged such that the peripheral cylindrical structure is not driven by the main cylindrical body.

2. Roller for a wire-feed device according to claim 1, wherein the means for the peripheral cylindrical structure to be driven in rotation by the main cylindrical body comprises at least one first stop located on an external surface of the main cylindrical body and designed to interact with a second stop positioned on an internal face of the peripheral cylindrical structure.

3. Roller for a wire-feed device according to claim 2, wherein at least one of the at least one first and second stops is in the form of a key mounted on the corresponding surface.

4. Roller for a wire-feed device according to claim 1, wherein the displacement of the peripheral cylindrical structure in relation to the main cylindrical body is controlled by at least one elastic means arranged in the space which separates the peripheral cylindrical structure and the main cylindrical body.

5. Roller for a wire-feed device according to claim 4, wherein the at least one elastic means is arranged in the space which separates the peripheral cylindrical structure from the main cylindrical body, in at least one housing open into the space and carried by at least one of the peripheral cylindrical structure and the main cylindrical body.

6. Roller for a wire-feed device according to claim 4, wherein the at least one elastic means is arranged in the space which separates the peripheral cylindrical structure from the main cylindrical body, in at least one shoulder carried by one of the peripheral cylindrical structure and the main cylindrical body, and open in a direction towards one side of the roller crossed by the axis of rotation of the main cylindrical body.

7. Roller for a wire-feed device according to claim 4, further comprising a means of pre-tightening the at least one elastic means so as to create a preload of the at least one elastic means.

8. Roller for a wire-feed device according to claim 7, wherein the means of pre-tightening is formed by at least one washer fitted at a side of the peripheral cylindrical structure or of the main cylindrical body crossed by the axis of rotation of the main cylindrical body and arranged to create an axial tightening along an axis parallel to the axis of rotation of the main cylindrical body.

9. Roller for a wire-feed device according to claim 1, wherein at least one face of the roller crossed by the axis of rotation of the main cylindrical body is partitioned off by a disk mounted on the main cylindrical body and having a peripheral edge facing an interior wall of the peripheral cylindrical structure.

10. Roller for a wire-feed device according to claim 9, wherein the peripheral cylindrical structure is independent in the displacement of the peripheral cylindrical structure in relation to the main cylindrical body in relation to the disk and does not directly contact the disk.

11. Roller for a wire-feed device according to claim 9, wherein the peripheral cylindrical structure comprises a shoulder at its internal face designed to accommodate the peripheral edge of the disk.

12. Roller for a wire-feed device according to claim 1, wherein at least one of the main cylindrical body, the peripheral cylindrical structure, at least two elastic means, at least two pre-tightening means, and at least two partitioning disks are mounted symmetrically on either side of a plane perpendicular to the axis of rotation of the main cylindrical body.

13. Wire-feed device comprising at least one roller according to claim 1.

14. Wire-feed device according to claim 13, wherein the at least one roller is a crimping roller.

* * * * *